United States Patent [19]
Fields

[11] Patent Number: 5,365,145
[45] Date of Patent: Nov. 15, 1994

[54] EMERGENCY LIGHTING SYSTEM

[75] Inventor: Gregory S. Fields, Las Vegas, Nev.

[73] Assignee: Gael, Inc., Las Vegas, Nev.

[21] Appl. No.: 103,542

[22] Filed: Aug. 9, 1993

[51] Int. Cl.⁵ ............................................ H05B 37/00
[52] U.S. Cl. .................... 315/86; 315/185 R; 362/20; 362/183; 362/251; 307/66
[58] Field of Search ............................ 315/86, 93, 185; 362/20, 183, 148, 251; 307/66, 64, 85

[56] References Cited

U.S. PATENT DOCUMENTS

| | | | |
|---|---|---|---|
| 3,833,817 | 9/1974 | Patel | 307/66 |
| 4,945,280 | 7/1990 | Begholli | 315/129 |
| 5,022,613 | 6/1991 | Peel | 246/125 |
| 5,149,185 | 9/1992 | Mandy | 315/86 X |

Primary Examiner—Benny Lee
Assistant Examiner—Reginald A. Ratliff
Attorney, Agent, or Firm—Philip D. Junkins

[57] ABSTRACT

An emergency lighting system for providing low voltage DC battery powered illumination to one or more areas of a home, apartment, office or other building structure in an emergency mode upon the failure or termination in such areas of a normal AC power mode. The system includes a voltage step-down transformer with the leads of its primary winding interconnected to a normal AC power source and forming therewith an AC circuit. A power rectifier has its input leads interconnected to the terminals of the low AC voltage secondary winding of the transformer and its DC voltage output leads interconnected to the terminals of an emergency battery power source. One or more low voltage incandescent lamps are interconnected to the terminals of the battery and form therewith an emergency DC circuit. A control relay interacts between the AC circuit and the DC circuit of the system with the DC circuit contacts of the relay interconnected in one of the low voltage leads of the DC circuit between the lamps and the battery and with the coil of the relay interconnected in the AC circuit for maintaining the DC contacts of the DC circuit open during normal AC current flow in the AC circuit and responsive to a termination or failure of the AC power source and cessation of AC current flow in the AC circuit to close the DC circuit contacts of the relay whereby the low voltage lamps are energized by the battery to produce emergency illumination.

14 Claims, 3 Drawing Sheets

EMERGENCY LIGHTING SYSTEM

FIELD OF THE INVENTION

The present invention relates to emergency lighting systems for residential homes, apartment dwellings, office buildings and other structural facilities. More particularly, the invention relates to emergency lighting systems that are automatically placed into service during emergency situations caused by power failure, fire, smoke detection, unauthorized intrusion, earthquake and other unexpected causes.

BACKGROUND OF THE INVENTION

There are numerous housing and building situations where emergency lighting may be required or desired and many systems are currently on the market for providing and controlling emergency lighting. A most common situation requiring the need for an emergency back-up lighting system relates to the failure of the normal AC power source for a building or facility. The need for emergency lighting may also arise when normal lighting is reduced or eliminated by smoke or other adverse ambient conditions, or when intruders are detected as by audible or silent alarm systems.

One common back-up or emergency lighting system utilizes AC power to illuminate one or more gas discharge lamps under normal conditions and causes one or more of such lamps to be operated from battery power when AC power fails, Both lamps may be powered from a ballast when in the AC mode, with one of the lamps being powered from the battery through an inverter in the DC mode; or one lamp may be powered from a ballast in the AC mode and the other lamp may be powered from an inverter in both modes, the inverter receiving its input from the AC source through a DC power supply in the AC mode and from the battery in the DC mode; or both lamps may be powered from inverters through DC power supplies in the AC mode, and one of the lamps from an inverter powered by a battery in the DC mode. Such a system is subject to relatively short life and operation of the battery and burn out of the inverter.

An improved emergency lighting system utilizing gas discharge lamps has been disclosed in U.S. Pat. No. 4,977,351 granted to J. P. Bavaro et al. The Bavaro et al system includes at least one gas discharge lamp, a source of AC power, means for normally operating the lamp with power from the AC source, a DC/AC inverter, and a rechargeable battery. A DC means is provided which is operative under selective emergency conditions for operating the lamp from the inverter with the inverter being powered by the battery.

Another common emergency lighting system has included a plurality of low voltage (12 volts) incandescent lamps connected in parallel to the secondary winding of a step down transformer of which the primary winding is connected to a 120 volt AC primary power source. When the primary power source fails a rechargeable back-up battery powered emergency system is interconnected via a relay switch to the lamps through circuitry which also includes the secondary winding of the step down transformer. The back-up emergency system is disconnected from the lamps via the relay switch and the battery recharged when the AC primary power source is again under normal operation. Where using the same lamps for both normal and emergency illumination, the illumination under battery power is substantially reduced unless the emergency battery source has a voltage approaching that of the voltage across the secondary winding of the step down transformer. Batteries with such low voltage ratings, and of the rechargeable type as required by the foregoing system, have a high initial cost and a relatively short life.

An improved emergency lighting system utilizing incandescent lamps has been disclosed in U.S. Pat. No. 5,149,185 granted to R. R. Mandy. A plurality of low voltage lamps (12 volts) in parallel electrical arrangement are powered from the secondary winding of a step down transformer connected to a 120 volt AC primary power source. When the primary power source is operative in normal fashion a triple pole, double throw relay switch of the emergency lighting system connects, via two of the poles, a charger to an emergency battery power source, and a third pole of the switch connects the lamps across the secondary winding of the transformer. When the primary AC power source is off, the first and second poles of the relay switch connect the emergency battery power source to selected ones of the lamps and the third pole disconnects the secondary winding from the lamps such that the only load other than system wiring across the emergency battery power source is that of the selected ones of the lamps to provide minimal emergency lighting.

It is a primary object of the present invention to provide an emergency lighting system for residential homes, apartment dwellings, office buildings and other structural facilities wherein the system includes low voltage battery powered lighting means independent of the normal AC powered lighting means.

It is a further object of the invention to provide an emergency lighting system for the one or more rooms and halls of homes, office facilities and the like wherein the system includes low voltage battery powered lighting means independent of the normal AC powered lighting means and responds automatically to AC power failure, fire, smoke detection, panic alarm actuation, unauthorized intrusion, earthquake trauma and other unexpected causes.

It is still a further object of the invention to provide an emergency lighting system for homes, apartment dwellings, office buildings and other structural facilities wherein the system includes low voltage battery powered back-up lighting means in which the battery of the system is recharged automatically via a normal AC power source when the emergency system is inactive.

It is yet another object of the invention to provide an emergency lighting system for homes, office buildings and the like which includes low voltage battery powered back-up lighting means capable of operation for extended periods of time independent of the normal AC powered lighting means of such homes and buildings, and which is activated automatically upon the occurrence of AC power failure and other unexpected emergency events and/or causes, and wherein the battery of the system is recharged automatically via a normal AC power source when the emergency system is inactive.

Other objects and advantages of the invention will be apparent from the following summary and detailed description of the emergency lighting system of the invention taken together with the accompanying drawing figures.

SUMMARY OF THE INVENTION

The present invention relates to an improved emergency lighting system for residential homes, apartment dwellings, office buildings and other structural facilities. The emergency lighting system of the invention includes at least one and preferably two or more low voltage emergency incandescent lamps connected in parallel to a rechargeable storage battery power source which during emergency lighting service provides about 12 volts of DC power to the lamps for extended periods of time. Each emergency incandescent lamp (preferably of halogen type with a 35 watt rating) is connected in series to a protective thermal overload or circuit breaker device to protect the lamp from experiencing overheating and damage during long periods of use. Also, each emergency lamp (and its respective series-connected protective device) has wired in parallel therewith a light emitting diode ("LED") device and associated resistor with the LED device located at the control panel of the emergency lighting system for indicating by green glow operation (illumination) of the lamp. Current to each individual emergency lamp is also controlled by a manually operated switch so that if illumination by a particular lamp is not required during an extended period of power Failure it may be turned off so as to extend battery life.

The DC current path From the positive terminal of the battery power source to the parallel set of emergency lamps includes a DC circuit fuse (preferably of 10 amp rating) and a main control relay. The main control relay includes normally open DC circuit contacts which are closed during activation of the emergency lighting system and such relay is protected from excess current draw or short circuiting by the DC circuit fuse. The negative terminal of the battery power source is connected to the one or more emergency lamps.

While normal 120 volt AC current is available within the home, apartment, office or other building structure, the battery power source of the emergency lighting system is constantly under recharge (until reaching the point of full charge) by means of a 120 volt AC step-down transformer and a full wave bridge rectifier assembly. Normal AC current is provided to the emergency system via parallel connection thereof at the junction box of a hard wired smoke detector within the building structure. The system's main AC power line from such junction box, provides AC current flow through a main fuse, a manual control test switch, the AC circuit contacts of a smoke detector relay (normally biased by mechanical means to a closed position), the parallel coil circuit and transformer circuit contacts (normally biased to an open position but held to the closed position by such parallel coil circuit) of the main control relay, and the primary coil of the step-down transformer with return to the smoke detector junction box.

If the smoke detector is activated by the presence of smoke the switch leg lead of the device provides DC current flow to the control coil of the smoke detector relay thereby opening the AC circuit contacts of such relay and terminating current flow through the primary coil of the step-down transformer. At the time of termination of AC current flow through the main control relay the DC current contacts of such relay are closed and DC current flow is effected within the low voltage DC circuitry of the emergency lighting system. If a power failure occurs within the home, apartment, office or other building structure in which the emergency lighting system of the invention is installed, the main control and smoke detector relays operate in the same manner as described above and DC current flow is effected within the low voltage DC circuitry of the system.

There is included across the secondary coil of the step-down transformer, and before the full wave bridge rectifier assembly, a peak inversion voltage component comprised of a half wave rectifier in series with an LED device and an LED resistor. This LED device indicates the "on" (red glow) or "off" status of the main power supply and/or of the battery charging circuitry and is located at the control panel of the emergency lighting system of the invention.

The basic emergency lighting system of the present invention is designed to readily incorporate additional optional switching controls, i.e., additional people protection options. Thus, the system of emergency low voltage DC lamps within a residential home can be activated by the opening of a garage door of the home utilizing a conventional electronic signal generator and signal receiver for controlling the garage door opener through the connection of an override relay to the switch terminal of the door opener and use of a time delay release device to deactivate the low voltage lamps after a set period of time. A further optional switch control for activation of the low voltage DC lamps of the emergency system involves the connection of an additional override relay to a motion detection switch sensitive to earthquakes and the use of a time delay release device to deactivate the lamps after a set period of time. Still further optional switch controls for activation of the lamps of the emergency lighting system of the invention include override relays controlled by a panic button switch or remote controller or controlled by an intruder alarm system.

DETAILED DESCRIPTION OF PREFERRED EMBODIMENTS OF THE INVENTION

Figure 1:
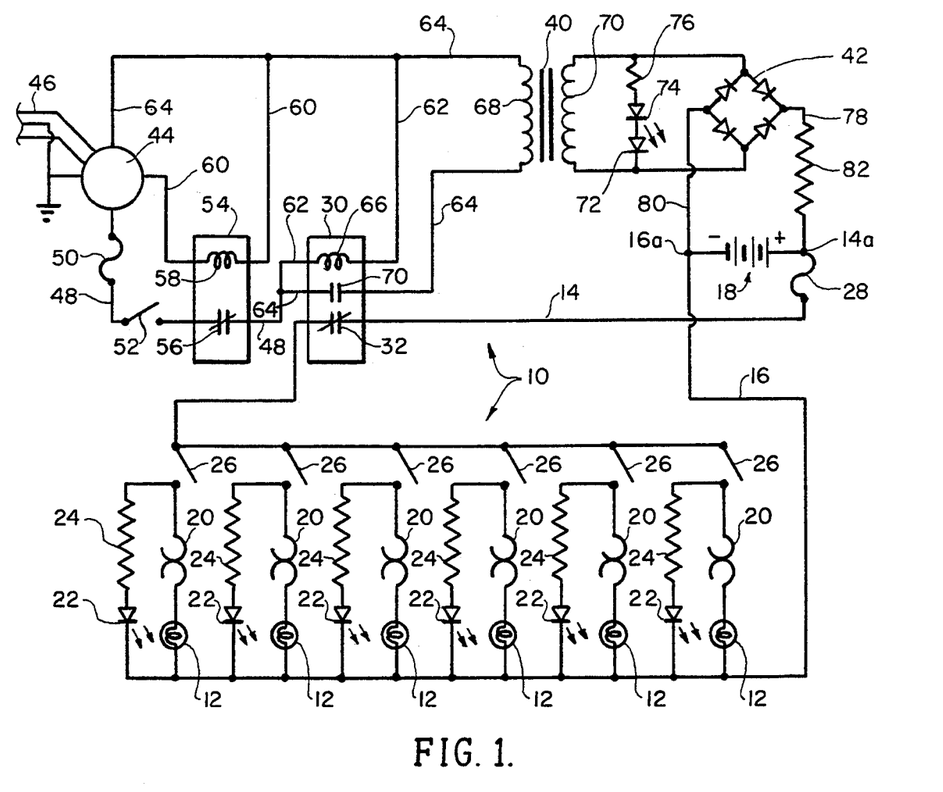
FIG. 1 is a wiring diagram of a basic emergency lighting system, in accordance with the present invention, for home, apartment or office installation and use including a multiplicity of low voltage direct current emergency incandescent lamps which are energized by one or more rechargeable batteries upon the detection of smoke by a smoke detector coupled to the system or by a general failure of AC power fed to the system through the smoke detector.

Referring now to FIG. 1 of the drawings, an emergency lighting system 10 for home, apartment, office or other building structure use is illustrated including a multiplicity of low voltage emergency incandescent lamps 12 connected in parallel by wires 14 and 16 to the positive and negative terminals, respectively, of a rechargeable storage battery 18. Each emergency lamp 12 (preferably of halogen type with a 35 watt rating) is connected in series to a protective thermal overload or circuit breaker device 20 (located in close proximity to the lamp) to protect the lamp from experiencing overheating and damage during long periods of emergency use. Also, each emergency lamp 12 (and its respective series-connected protective device 20) has wired in parallel thereto a light emitting diode ("LED") device 22 and associated resistor 24 with the LED device located at the control panel of the emergency lighting system for indicating by green glow the operation (illumination) of the respective lamp. Current flow to each individual emergency lamp 12 is also controlled by a normally closed, manually operated switch 26 (located at the control panel of the system) so that if illumination by a particular lamp is not required during an extended period of power failure it may be turned off by opening its respective switch 26 so as to extend battery life.

The DC current path (wire 14) from the positive terminal of the battery power source 18 to the parallel set of emergency lamps 12 includes a DC circuit fuse 28 (preferably 10 amp rating) and a main control relay 30. The main control relay 30 includes normally open DC circuit contacts 32 which are mechanically biased to their closed position during activation of the emergency lighting system 10 and such relay is protected from excess current draw or short circuiting by the DC circuit fuse 28. As previously indicated, the negative terminal of the battery power source 18 is connected by wire 16 to each of the emergency lamps 12.

While normal 120 volt AC current is available within the home, apartment, office or other building structure, the battery power source 18 of the emergency lighting system 10 is constantly under recharge (until reaching the point of full charge) by means of a 120 volt AC step-down transformer 40 and a full wave bridge rectifier assembly 42. Normal AC current is provided to the emergency system 10 via parallel connection thereof at the junction box of a hard wired smoke detector 44 which receives its power input via a three wire grounded cable 46 within the building structure. The system's main AC power line 48 from the smoke detector junction box 44 provides AC current flow through a main fuse 50 and a manual control test switch 52 to a smoke detector relay 54. The AC circuit contacts 56 of the relay 54 in line 48 are normally biased by mechanical means to a closed position but are held (during emergency situations) to an open position by control coil 58 of the smoke detector relay, such coil being energized via the switch leg wire 60 of the smoke detector.

Power line 48 leading from the smoke detector relay 54 splits into parallel lines 62 and 64 with line 62 including relay coil 66 of the main control relay 30 and with line 64 leading to the primary coil 68 of the step-down transformer 40 and thereafter back to the smoke detector junction box 44. The line 64 includes transformer circuit contacts 70 which are mechanically biased to an open position but are held to their closed position by relay coil 66 of the main control relay 30 so-long-as AC current is available via the junction box 44. The relay coil 66 also maintains the DC current circuit contacts 32 of the main control relay 30 in their open position against the mechanical bias of the relay which closes such contacts when no AC current flow is available to the system.

If the smoke detector 44 is activated by the presence of smoke, the switch leg lead 60 of the device provides DC current flow through the control coil 58 of the smoke detector relay 54 thereby opening the AC circuit contacts 56 of such relay and terminating AC current flow through the main control relay 30 and the primary coil 68 of the step-down transformer 40. At the time of termination of AC current flow through the main control relay 30 the DC current contacts 32 of such relay are closed by the mechanical biasing thereof and DC current flow is effected within current paths 14 and 16 of the low voltage DC circuitry by battery power source 18 whereby the emergency lamps are energized with the production of emergency illumination. If an AC power failure occurs within the home, apartment, office or other building structure in which the emergency lighting system 10 of the invention is installed, the main control relay 30 and the smoke detector relay 54 operate in the same manner as described above and DC current flow is effected within the low voltage DC circuitry of the system.

There is included across the secondary coil 70 of the step-down transformer 40, and before the full wave rectifier assembly 42, a peak inversion component comprised of a half wave rectifier 72 in series with an LED device 74 and an LED resistor 76. The LED device 74 indicates the "on" (red glow) or "off" status of the main AC power supply and/or of the battery charging circuitry of the system 10 and is located proximate the main switch 52 at the control panel of the emergency lighting system of the invention. Wire leads 78 and 80 connect the full wave rectifier assembly 42 to the battery terminals 14a and 16a, respectively. A slow charging resistor 82 is located in the lead wire 78 between the rectifier assembly 42 and battery terminal 14a.

Figure 2:
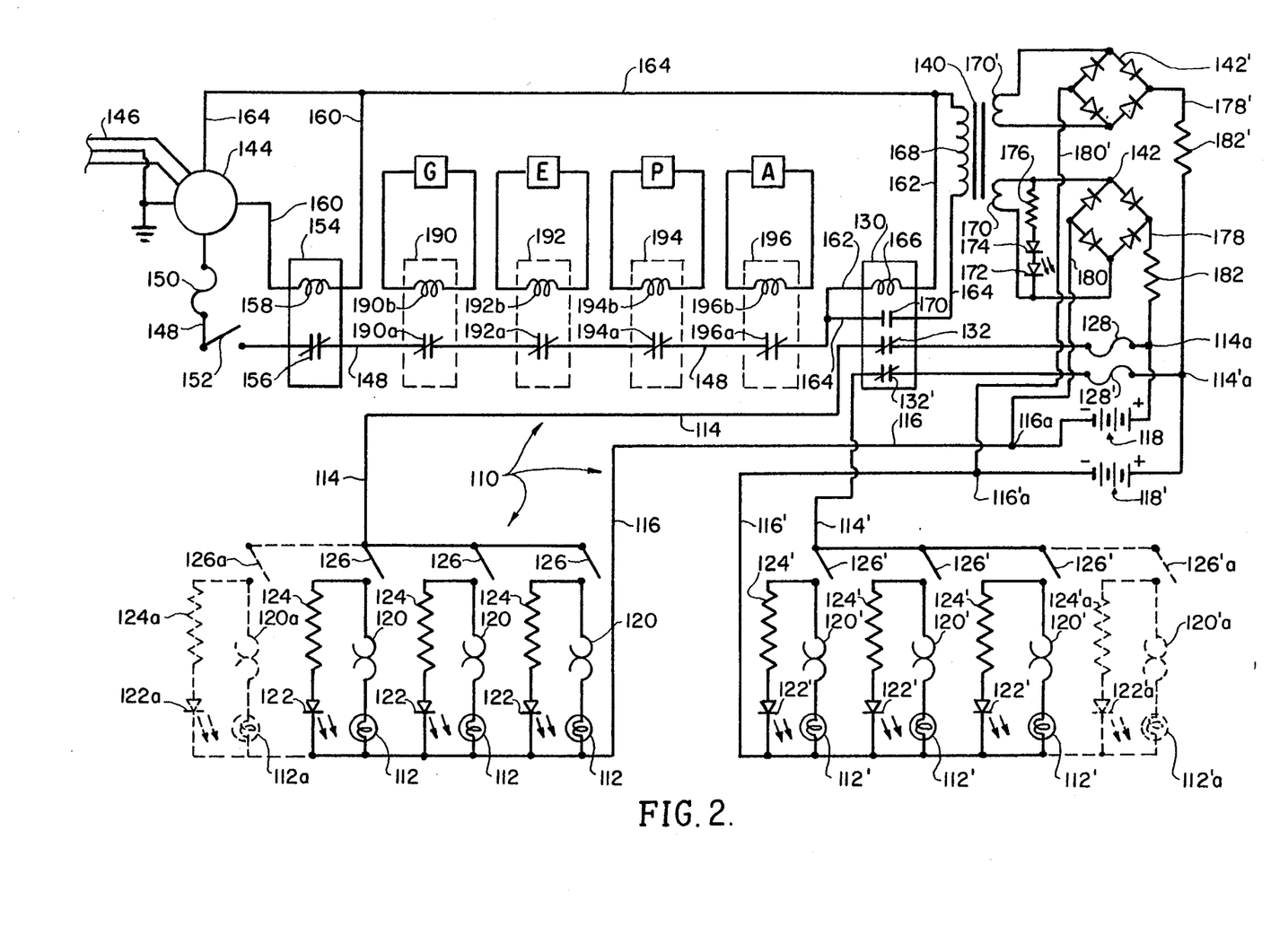
FIG. 2 is a wiring diagram of a basic emergency lighting system, in accordance with the invention, for home installation and use including a multiplicity of battery powered emergency incandescent lamps which are activated upon detection of smoke by a smoke detector coupled to the system, by a general failure of AC power within the home, and by garage opening, panic alarm actuation, unauthorized intrusion, earthquake trauma and other unauthorized or unexpected causes.

Referring now to FIG. 2 of the drawings, an emergency lighting system 110, in accordance with the invention, is illustrated to the show the addition of optional detection and switching controls to provide a home, apartment, office or other building structure with emergency illumination and security against earthquake trauma and unauthorized intrusion and for automatic garage door and panic alarm actuation. A first bank of low voltage emergency incandescent lamps 112 are connected in parallel by wires 114 and 116 to the positive and negative terminals, respectively, of a rechargeable storage battery 118. Each emergency lamp 112 is connected in series to a protective thermal overload or circuit breaker device 120 to protect the lamp from overheating during long periods of emergency usage. Also, each emergency lamp 112 (and its respective series-connected protective device 120) has wired in parallel thereto an LED 122 and associated resistor 124 with the LED device located at the control panel of the emergency lighting system for visual indication as to whether or not the lamp is in operation. Current flow to each individual emergency lamp 112 is also controlled by a normally closed manually operated switch 126 (located at the control panel of the system) so that illumination of a particular lamp may be terminated if not required during a period of power failure. As indicated in doted outline in FIG. 2, one or more additional lamps 112a may be added to the bank of lamps 112 with each such additional lamp having an associated series connected thermal protective device 120a, parallel connected LED 122a and resistor 124a, and manually operated switch 126a.

Where the emergency lighting system requires an extensive number of emergency lamps, a second bank of lamps 112' may be provided with the lamps thereof connected in parallel by wires 114' and 116' to the positive and negative terminals, respectively, of a second rechargeable storage battery 118'. Each emergency lamp 112' of the second bank of lamps is connected in series to a protective thermal device 120' and in parallel to an LED 122' and resistor 124' as are the lamps of the first bank. Additional lamps 112'a (with associated protective devices 120'a, LEDs 122'a and resistors 124'a) may be added to the second bank of lamps. Current flow to each individual lamp 112' is also controlled by a manually operated control panel switch 126'.

The DC current path (wire 114) from the positive terminal of the battery power source 118 to the parallel set of emergency lamps 112 includes a DC circuit fuse 128 and a main control relay 130. In like fashion, the current path (wire 114') from the positive terminal of the battery power source 118' for the second bank of lamps 112' includes a DC fuse 128' and main control relay 130. The main control relay 130 includes normally open DC circuit contacts 132 and 132' which are mechanically biased to their closed position during activation of the emergency lighting system 110 and such relay is protected from excess current draw or short circuiting by the DC circuit fuses 128 and 128'. As previously indicated, the negative terminals of batteries 118 and 118' are connected by wires 116 and 116', respectively, to the banks of emergency lamp 112 and 112', respectively.

While normal 120 volt AC power is available within the home, apartment, office or other building structure, the battery power sources 118 and 118' of the emergency lighting system 110 of FIG. 2 is constantly under recharge (until reaching the point of full charge) by means of a 120 volt AC step-down transformer 140 and full wave bridge rectifier assemblies 142 and 142' which are connected, respectively, across secondary coils 170 and 170' of the transformer 140, and to batteries 118 and 118', respectively. Normal AC current is provided to the emergency system 110 via parallel connection thereof at the junction box of a hard wired smoke detector 144 which receives its power input via a three wire grounded cable 146 within the building structure. The system's main AC power line 148 from the smoke detector junction box 144 provides AC current flow through a main fuse 150 and a manual control test switch 152 (both located at the system's control panel) to a smoke detector relay 154. The AC circuit contacts 156 of the relay 154 in line 148 are normally biased by mechanical means to a closed position but are held (during emergency situations) to an open position by control coil 158 of the smoke detector relay, such coil being energized via the switch leg wire 160 of the smoke detector.

Power line 148 leading from the smoke detector relay 154 splits into parallel lines 162 and 164 at the main control relay 130 with line 162 including relay coil 166 and with line 164 leading to the primary coil 168 of the step-down transformer 140 and thereafter back to the smoke detector junction box 144. The line 164, within the main control relay 130, includes transformer circuit contacts 170 which are mechanically biased to an open position but are held to their closed position by relay coil 166 so-long-as AC current flow is available to the system via the junction box of the smoke detector 144. The relay coil 166 also maintains the DC current circuit contacts 132 and 132' of the main control relay in their open position against the mechanical bias of the relay which closes such contacts when no AC current flow is available to the system.

If the smoke detector 144 is activated by the presence of smoke, the switch leg lead 160 of the detector provides DC current flow through the control coil 158 of the smoke detector relay 154 thereby opening the AC circuit contacts 156 of such relay and terminating AC current flow through the main control relay 130 and the primary coil 168 of the step-down transformer 140. At the time of termination of AC current flow through the main control relay 130 the DC current contacts 132 and 132' of such relay are closed by the mechanical biasing thereof and the DC current flow is effected within current paths 114–116 and 114'–116', respectively, of the low voltage DC circuitry by battery power sources 118 and 118' whereby the emergency lamps 112 and 112' are energized with the production of emergency illumination. If an AC power failure occurs within the home, apartment, office or other building structure in which the emergency lighting system 110 of the invention is installed, the main control relay 130 and the smoke detector relay 154 operate in the same manner as described above and DC current flow is effected within the low voltage DC circuitry of the system.

There is included across the secondary coil 170 of the step-down transformer 140, and before the full wave rectifier assembly 142, a peak inversion component comprised of a half wave rectifier 172 in series with an LED device 174 and an LED resistor 176. The LED device 174 indicates the "on" (red glow) or "off" status of the main AC power supply and/or the battery charging circuitry of the system 110 and is located proximate the main switch 152 at the control panel of the emergency lighting system of the invention. Wire leads 178 and 180 connect the full wave rectifier assembly 142 to the battery terminals 114a and 116a, respectively, of battery 118. A slow charging resistor 182 is located in the lead wire 178 between the rectifier assembly 142 and battery terminal 114a.

No peak wave inversion component (as described above) is required between across the secondary coil 170' of the step-down transformer 140 since indication of the "on" or "off" status of the emergency lighting system of the invention is provided by LED device 174. Wire leads 178' and 180' connect the full wave rectifier assembly 142' to the battery terminals 114'a and 116'a, respectively, of battery 118'. A slow charging resistor 182' is located in the lead wire 178' between the rectifier assembly 142' and battery terminal 114'a.

As indicated hereinbefore, the emergency lighting system 110 of FIG. 2 includes optional detection and switching controls to provide a home, apartment, office or other building structure with emergency illumination and security against earthquake trauma and unauthorized intrusion and for automatic garage door and panic alarm actuation. Thus, one or more additional optional control relays may be connected in sequence into the system's main AC power line 148 between the smoke detector relay 154 and the main control relay 130. Four such optional control relays 190, 192, 194 and 196 are shown in doted outline with each relay including AC circuit contacts 190a, 192a, 194a and 196a, respectively, in line 148. Such contacts are normally biased by mechanical means to an open position but are held to a closed position by control coils 190b, 192b, 194b and 196b, respectively. Interconnected to optional control relay 190 and its control coil 190b is a signal actuated garage door opening device G and interconnected to optional control relay 192 and its control coil 192b is an earthquake motion-sensing device E. Interconnected to optional control relay 194 and its control coil 194b is a panic alarm device P and interconnected to optional control relay.196 and its control coil 196b is an intrusion alarm device A. When any one of the devices Q, E, P or A is activated the respective control coil of the control relay interconnected to such device is deactivated and the AC circuit contacts of such relay are released with AC current flow in the main AC power line 148 terminated and with the low voltage DC emergency lighting system thereby becoming activated in the same manner as previously described with respect to operation of the smoke detector 144 and its associated control relay 154. It is to be understood that additional detection and control devices can be interconnected to the emergency lighting system of the present invention through additional control relays interconnected to the system's main AC power line 148.

It is to be understood that, with respect to the emergency lighting system circuitry of FIG. 2, a second step-down transformer (120 volts AC down to 12 volts AC) may be added to the system with its primary coil or winding being attached to the main power line 148 and power line 164 leading from the junction box of the smoke detector 144. The secondary 12 volt AC coil or winding of this additional transformer feeds a third full wave rectifier assembly which supplies DC power individually to all of the optional control relays 190, 192, 194 and 196 and their respective control coils 190b, 192b, 194b and 196b thereby maintaining the respective AC circuit contacts 190a, 192a, 194a and 196a closed when normal 120 volt AC power is applied to the system via the smoke detector circuitry. When any one of the special devices G, E, P or A (garage door opener, earthquake sensor, panic alarm or intrusion alarm, respectively) is activated the respective AC circuit contacts of the associated optional control relays are opened (released by the respective control coil) the emergency lighting system of the invention is activated as previously described. A "delay-off" timer is installed in circuit line 162 before the relay coil of the main control relay 130. The timer functions when one of the special optional devices G, E, P or A is activated and only reactivates current flow in line 162 after a preset time period, i.e., several seconds to 10 to 15 minutes.

Figure 3:
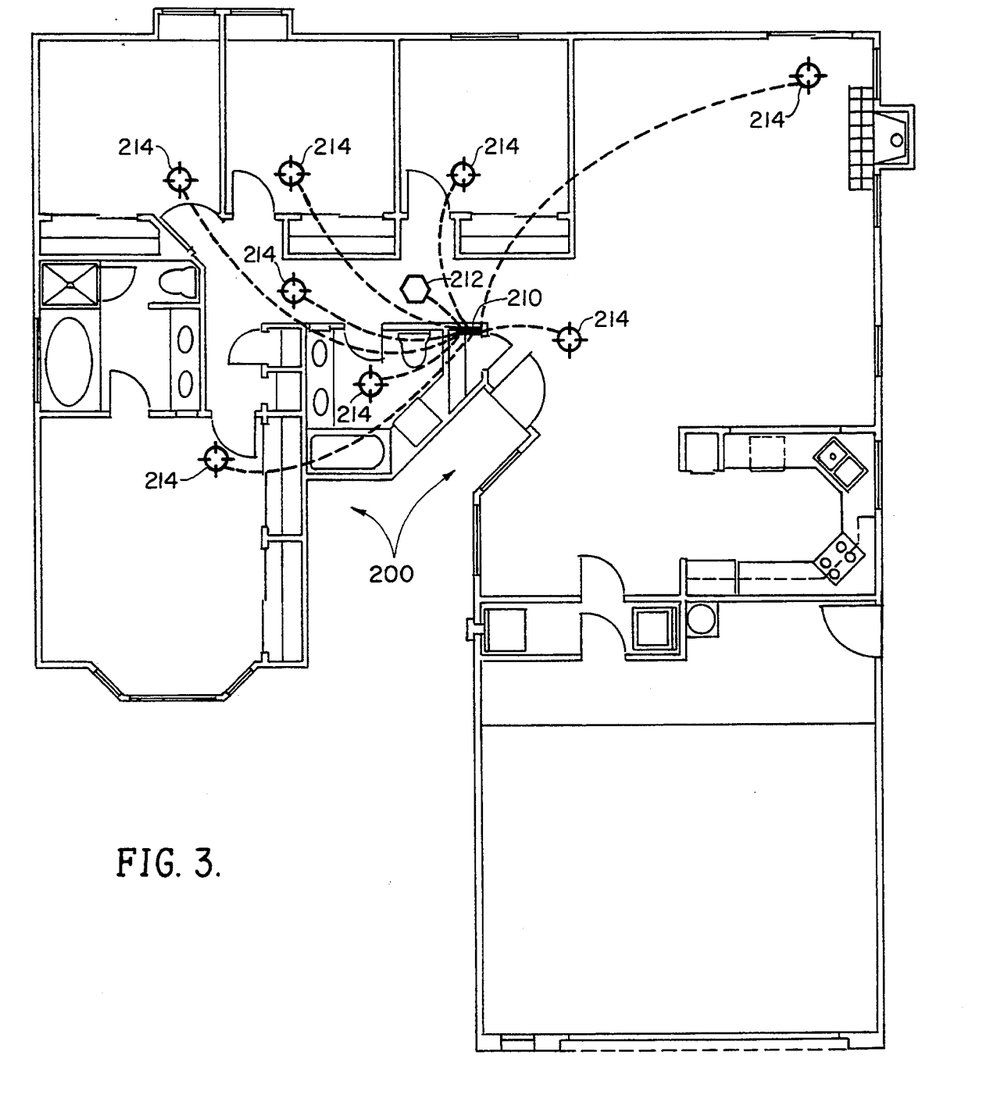
FIG. 3 is an exemplary home floor plan showing a layout of the emergency lighting system of the invention including: the location of low voltage lamps in rooms and hall; the location of the low voltage DC power supply and control panel; and the location of a smoke detector.

In FIG. 3 there is illustrated an exemplary home floor plan 200 showing a layout of the basic emergency lighting system of the invention. A centrally located control station 210 for the system includes a locked cabinet for enclosing the system's step-down transformer, battery power source(s), associated electronic switch gear and printed circuit boards, system fuses, and interconnect terminals. The control panel for the system is mounted to a main circuit board and includes the main "on" and "off" switch and associated LED display for the system, individual lamp switches and their respective LED displays, and any switches (and associated LED displays) necessary to separately deactivate the optional detection and switching controls relating to intrusion alarm, panic alarm, garage opening and earthquake sensing devices. A hard wired smoke detector unit 212 is shown to be located in a hall interconnecting the various rooms of the home. Emergency lamps 214 are shown located throughout the home.

While the present invention has been shown and described above with respect to several different embodiments, it will be apparent to those skilled in the art that changes in form and detail may be made therein by one skilled in the art without departing from the spirit and scope of the invention as set forth in the following claims.

What is claimed is:

1. An emergency lighting system for providing low voltage DC battery powered illumination to one or more areas of a home, apartment, office or other building structure in an emergency mode upon the failure or termination in such areas of a normal AC power mode, said system comprising:
    a) a source of normal AC power having interconnecting leads to the primary high voltage winding of a voltage step-down transformer and forming therewith an AC circuit;
    b) AC power rectifying means, including input terminals and output terminals, having its input terminals connected to the secondary low voltage winding of said transformer;
    c) an emergency battery power source having its terminals connected to the output terminals of said rectifying means to receive low voltage DC power for storage therein when said normal AC power source is operative;
    d) at least one low voltage incandescent lamp interconnected by low voltage leads to the terminals of said battery power source and forming therewith an emergency DC circuit; and
    e) control relay means for interacting between said AC circuit and said DC circuit, said relay means including DC circuit contact means interconnected in one of the low voltage leads of said DC circuit from said lamp to a terminal of said battery source, and said relay means including coil means in said AC circuit for maintaining said DC circuit contacts in their open position during AC current flow in said AC circuit and responsive to a termination or failure of said AC power source and cessation of AC current flow in said AC circuit to close said DC circuit contact means whereby said low voltage lamp is energized by said battery source to produce emergency illumination.

2. The emergency lighting system as claimed in claim 1 wherein the AC circuit of said system includes a hard wired smoke detector which through its junction box comprises the source of normal AC power for said circuit and a smoke detector relay which terminates AC current flow within said AC circuit upon the detection of smoke by said detector and thereby activates the DC circuit of said system to produce emergency illumination.

3. The emergency lighting system as claimed in claim 1 wherein the AC circuit of said system includes an intrusion relay interconnected to an intruder sensor which upon sensing an intruder activates said intrusion relay to terminate the flow of AC current within said circuit and thereby activate the DC circuit of said system to produce emergency illumination.

4. The emergency lighting system as claimed in claim 1 wherein the AC circuit of said system includes a panic relay interconnected to a panic alarm switch which upon closure activates said panic relay to terminate the flow of AC current within said circuit and thereby activate the DC circuit of said system to produce emergency illumination.

5. The emergency lighting system as claimed in claim 1 wherein the AC circuit of said system includes an earthquake relay interconnected to an earthquake sensor which upon sensing an earthquake activates said earthquake relay to terminate the flow of AC current within said circuit and thereby activate the DC circuit of said system to produce emergency illumination.

6. The emergency lighting system as claimed in claim 1 wherein the AC circuit of said system includes a garage door opener relay interconnected to a garage door opener signal receiver which upon receiving a signal for opening a garage door activates said door opener relay to terminate the flow of AC current within said circuit and thereby activate the DC circuit of said system to produce emergency illumination.

7. An emergency lighting system for providing low voltage DC battery powered illumination to one or more areas of a home, apartment, office or other building structure in an emergency mode upon the failure or termination in such areas of a normal AC power mode, said system comprising:
   a) a hard wired smoke detector which provides through its junction box a source of normal 120 volt AC power having interconnecting power leads to the primary high voltage winding of a 10-to-1 voltage step-down transformer and forming therewith an AC power circuit;
   b) AC power rectifying means, including input terminals and output terminals, having its input terminals connected to the secondary low voltage winding of said transformer to receive 12 volt AC power therefrom and rectify said AC power to 12 volt DC power;
   c) an emergency 12 volt DC rechargeable battery power source having its terminals interconnected to the output terminals of said power rectifying means to receive 12 volt DC power for storage therein when said normal AC power source is operative;
   d) a multiplicity of 12 volt DC incandescent lamps for providing emergency illumination, said lamps interconnected in parallel to low voltage leads from the terminals of said battery power source and forming therewith an emergency DC circuit;
   e) main control relay means for interacting between said AC circuit and said DC circuit, said main relay means including DC circuit contact means interconnected in one of the low voltage leads of said DC circuit from said lamps to said battery source, and said main relay means including coil means in said AC circuit for maintaining said DC circuit contacts in their open position during AC current flow in said AC circuit and responsive to a termination or failure of said AC power source and cessation of AC current flow in said AC circuit to close said DC circuit contact means whereby said incandescent lamps are energized by said battery source to produce emergency illumination; and
   f) smoke detector relay means including normally closed AC circuit contact means interconnected in said AC power circuit and including means responsive to the detection of smoke by said smoke detector to open said AC circuit contact means whereby AC current flow in said AC circuit is terminated and the DC circuit contacts of said main relay means are closed whereby said incandescent lamps are energized by said battery source to produce emergency illumination.

8. The emergency lighting system as claimed in claim 7 wherein each of said incandescent lamps for providing emergency illumination has connected in series therewith, and in close proximity thereto, a thermal overload device to protect each of said lamps from experiencing overheating and damage during long periods of use.

9. The emergency lighting system as claimed in claim 7 wherein said system includes a manual "on-off" control switch for said system in the 120 volt AC power lead between the junction box of said smoke detector and said smoke detector relay, said switch being located for actuation at the face panel of a master control box for said system and said face panel includes an LED device interconnected to the secondary windings of said step-down transformer to indicate when the system has been activated by said manual control switch.

10. The emergency lighting system as claimed in claim 9 wherein each of said incandescent lamps for providing emergency illumination has wired in parallel therewith an LED device, located at the face panel of said master control box, to indicate that said lamps are energized by current flow within said DC circuit.

11. The emergency lighting system as claimed in claim 10 wherein each of said incandescent lamps for providing emergency illumination has wired in series therewith a manual "on-off" lamp control switch, located at the face panel of said master control box, whereby individual lamps may be selectively deactivated from said system.

12. The emergency lighting system as claimed in claim 7 wherein the AC circuit of said system includes an intrusion relay interconnected to an intruder sensor, panic relay interconnected to a panic alarm switch, an earthquake relay interconnected to an earthquake sensor, and a garage door opener relay interconnected to a garage door opener signal receiver, said relays terminating the flow of AC current within the AC circuit when said intruder sensor, said panic alarm switch, said earthquake sensor, or said garage door signal receiver, respectively, senses an intruder, activates the panic alarm, senses an earthquake, or receives a garage door opener signal thereby activating the DC circuit of said system to produce emergency illumination.

13. The emergency lighting system as claimed in claim 12 wherein said system includes a second 10-to-1 voltage step-down transformer with its primary high voltage winding interconnected to said source of normal 120 volt AC power and with its secondary low voltage winding interconnected to the input terminals of a full wave rectifier which supplies via its output terminals low voltage DC current individually to coil means within said intrusion relay, said panic relay, said earthquake relay and said garage door opener relay whereby AC circuit contacts within said relays are maintained closed during normal AC current flow in said AC circuit and whereby upon activation of any one of said relays by its respective intruder sensor, panic alarm switch, earthquake sensor or garage door opener signal receiver the respective AC circuit contacts of said respective relay open with the cessation of AC current flow in said AC circuit and the DC circuit contacts of said main relay means are closed and the incandescent lamps are energized to produce emergency illumination.

14. The emergency lighting system as claimed in claim 13 wherein a "delay-off" timer is interconnected in the AC circuit immediately before the coil means of the main control relay whereby upon reactivation of AC current flow in the AC circuit the DC current flow within the DC circuit is continued for a preset amount of time.

* * * * *